June 4, 1963 J. A. JOHNSON 3,091,922
MULTI-STAGE PARALLEL FLOW TURBO-FAN
Filed Feb. 12, 1960 3 Sheets-Sheet 1

INVENTOR.
JOHN A. JOHNSON
BY
ATTORNEYS

June 4, 1963

J. A. JOHNSON 3,091,922

MULTI-STAGE PARALLEL FLOW TURBO-FAN

Filed Feb. 12, 1960

INVENTOR.
JOHN A. JOHNSON
BY
ATTORNEYS 3,091,922
MULTI-STAGE PARALLEL FLOW TURBO-FAN
John A. Johnson, 9 Sheridan Drive, Short Hills, N.J.
Filed Feb. 12, 1960, Ser. No. 8,469
2 Claims. (Cl. 60—35.6)
(Granted under Title 35, U.S. Code (1952), sec. 266)

The invention described herein may be manufactured and used by or for the Government for governmental purposes without the payment of any royalty thereon.

This invention relates to improvements in aircraft propulsion systems and more particularly to a propulsion system including a turbine engine and ducted fans driven by the engine, the duct work being so arranged that the engine and the fans operate in parallel, rather than in series, to produce an augmented air flow for propulsion of the associated aircraft.

It is among the objects of the invention to provide an improved aircraft propulsion system which can be utilized to provide vertical (VTOL) and steeply inclined (STOL) as well as substantially horizontal or conventional take-off and landing operations of the associated aircraft by utilizing the reaction to a downwardly or rearwardly directed air blast to provide the propulsive effort.

A further object resides in the provision of an aircraft propulsive system including a gas generating turbine engine and a plurality of ducted fans driven by the exhaust of the turbine engine through a free coupled turbine and operating in parallel with the engine and with each other to produce an augmented volume of discharge air and engine exhaust whereby the small volume, high speed engine exhaust discharge is converted into a large volume, slow speed discharge of engine and compressed air having a temperature somewhat elevated above the temperature of the ambient atmosphere.

A still further object resides in the provision of an aircraft propulsion system which includes a gas generating turbine engine, a free turbine driven by the engine exhaust, at least two high speed fans or impellers driven by the free turbine, and an enclosure for the free turbine and the impellers so arranged that the engine exhaust is directed to a tail pipe arrangement and each impeller draws air independently from the atmosphere, compresses such air and forces it to the common tail pipe arrangement, the engine exhaust gas and the compressed air from the impellers being mixed by the time it reaches the common tail pipe arrangement.

Other objects and advantages will become apparent from a consideration of the following description and the appended claims in conjunction with the accompanying drawings wherein:

Figure 1:
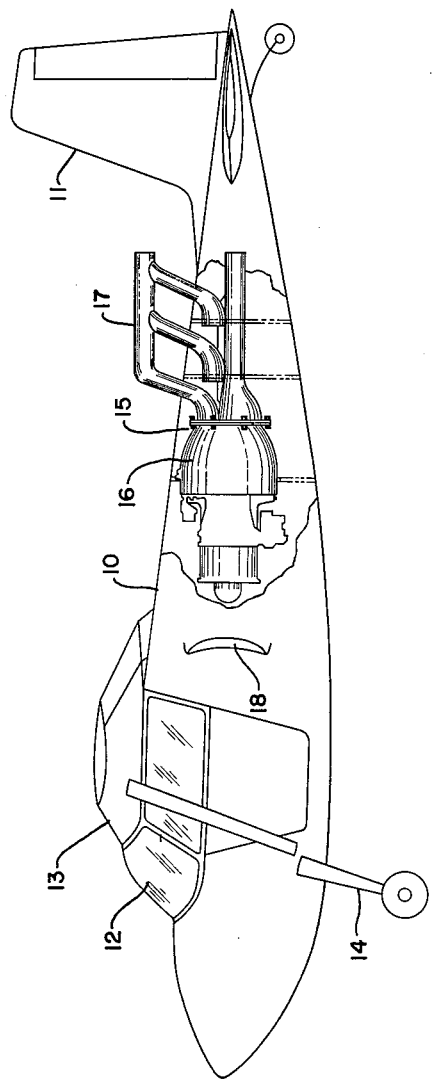
FIG. 1 is a somewhat diagrammatic side elevational view of an aircraft having a propulsion system constructed in accordance with the present invention, a portion of the aircraft being broken away to show the propulsion system.
Figure 3:
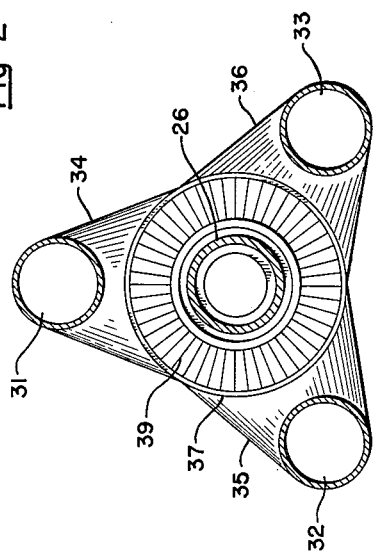
FIG. 3 is a transverse cross-sectional view substantially on a plane indicated by the line 3—3 on FIG. 2.
Figure 4:
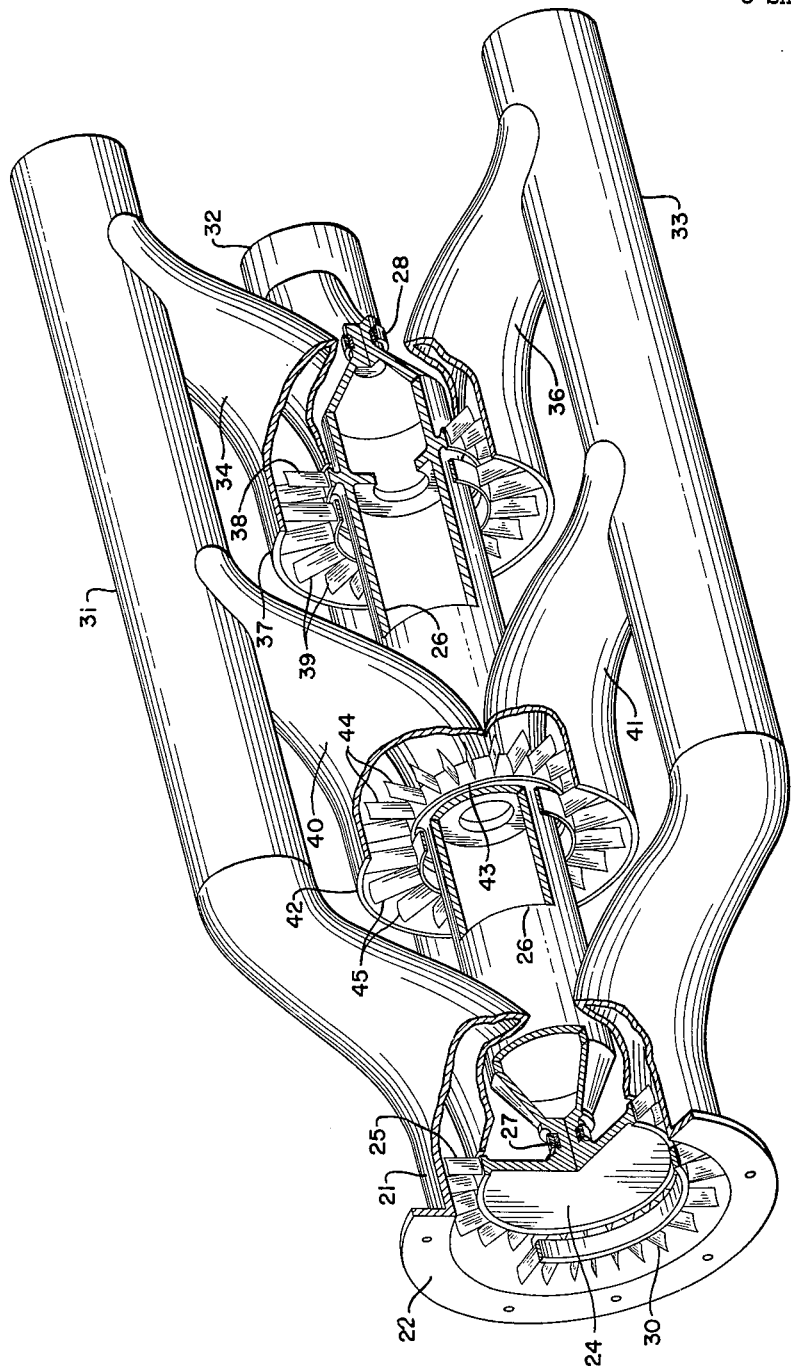
FIG. 4 is a perspective view of the assembly with the engine omitted, portions being broken away and shown in cross-section to better illustrate the construction thereof.

With continued reference to the drawings, the aircraft illustrated, by way of example, in FIG. 1 is a light, single engine passenger or observation aircraft having the usual body or fuselage 10, empenage 11, cabin 12, wings 13 and landing gear 14. The power plant or propulsion assembly is generally indicated at 15 and is mounted in the rearward portion of the aircraft fuselage 10. The propulsion assembly includes a gas turbine engine 16, which may be any one of several such engines now commercially available or may be a new engine of desired construction and operating characteristics, and an air induction and guidance unit 17. The specific construction of the gas turbine engine is not a part of the present invention, this invention being concerned with the unit 17 which is illustrated in detail in FIGS. 2, 3 and 4.

While FIG. 1 shows the power plant in fixed position in the aircraft for conventional or substantially horizontal take-off and flight, the same power plant can be movably mounted or provided with movable air directing devices in various ways well known to the art for vertical take-off and landings and short take-off and landing operation.

In the arrangement shown in FIG. 1 engine air intake scoops, as indicated at 18, are provided in the sides of the fuselage 10 and the tail pipe arrangement includes three substantially parallel discharge pipes directed toward the aircraft rudder and the two elevators. The reaction to the discharge of air and engine exhaust gas from the discharge pipes provides the thrust for propelling the aircraft.

Figure 2:
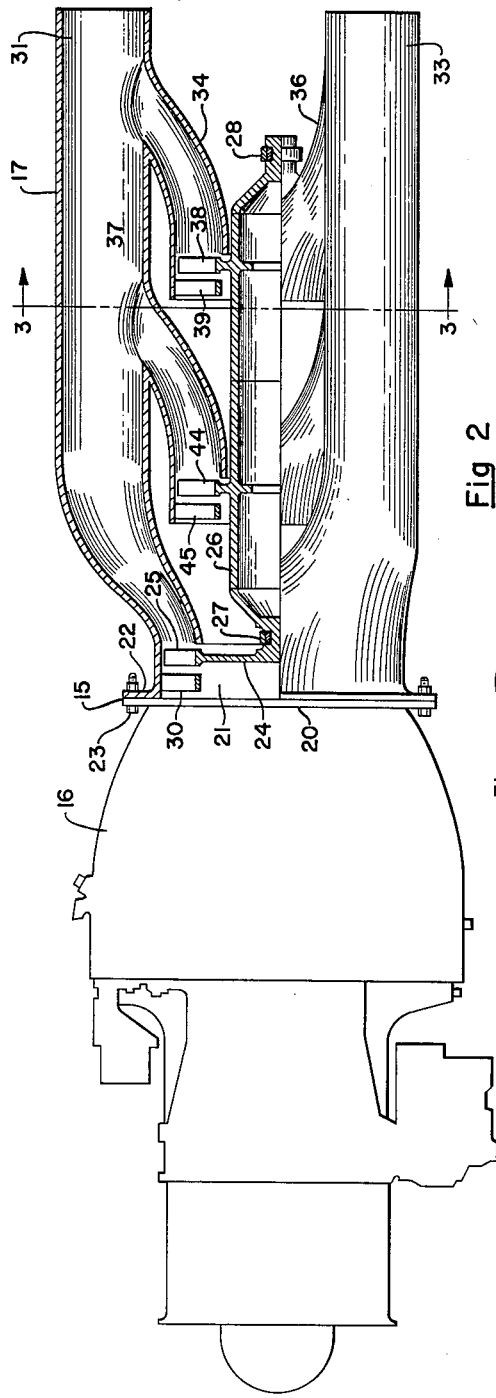
FIG. 2 is a side elevational view of the propulsion assembly, a portion of the assembly being broken away and shown in cross section to better illustrate the construction thereof.

As shown in FIG. 2, the engine 16 terminates at its rear end in an annular exhaust discharge opening and the burner housing has a terminal flange 20. The front end portion of the unit 17 provides a circular chamber 21 surrounded by an external, annular flange 22 which matches the flange 20, the two flanges 20 and 22 being firmly secured together by bolts 23. A turbine rotor 24 is disposed in the annular chamber 21 and is peripherally surrounded by a set of turbine blades 25. At its center, rotor 24 is mounted on the front end of a tubular turbine shaft 26 supported for rotation by anti-friction bearings 27 and 28, respectively disposed near the front and rear ends of shaft 26. The outer sleeves or races of bearings 27 and 28 are supported by fixed brackets or spiders, not illustrated, which constitute structural components of the unit 17.

An annular series of fixed, air guiding vanes or blades 30 is disposed in the annular chamber 21 between the turbine blades 25 and the rear end of the engine 16. These fixed blades are secured at their outer ends to an encircling structure, such as the wall of chamber 21, and serve to guide the engine exhaust into the turbine blades 25 in a manner to obtain efficient operation of the turbine.

Rearwardly of the annular chamber 21, the duct work constituting the housing of the unit 17 is constructed to provide three mutually parallel discharge conduits 31, 32 and 33 which are disposed around the shaft 26 with their axes spaced substantially equal angular intervals apart, and which carry the engine exhaust from chamber 21 at the rear side of turbine rotor 24 to the rear end of unit 17. It will be noted that turbine rotor 24 and shaft 26 have no mechanical connection whatever with engine 16 so that the turbine constituted by rotor 24 and shaft 26 is a free turbine which can rotate about its own axis without the necessity of accurate alignment of its axis with the rotational axis of the turbine engine.

Three funnel shaped, branch conduits 34, 35 and 36 extend inwardly and forwardly from the rear end portions of the discharge conduits 31, 32 and 33, respectively, and these branch conduits are flared and united at the forward ends to provide a circular chamber 37 annularly surrounding the rearward portion of shaft 26. Chamber 37 is substantially coaxial with shaft 26 and an annular series of impeller blades 38 is mounted on shaft 26 and disposed within chamber 37. Blades 38, together with the associated portion of shaft 26, constitute an axial flow fan or impeller which draws air through the open end of chamber 37, compresses the air and discharges it through the branch conduits 34, 35 and 36 into the discharge conduits 31, 32 and 33 where it is mixed with exhaust from engine 16 and other compressed air and discharged from the rear ends of the discharge conduits. An annular set of variable angle blades or vanes 39 is mounted in the open end of chamber 37 ahead of impeller 38 and serves to guide the intake air into the impeller blades in a manner to increase the efficiency of the impeller and to control the operation of the impeller.

A second set of three funnel shaped branch conduits, two of which are indicated at 40 and 41, are faired into the discharge conduits 31, 32 and 33 between the conduits 34, 35 and 36 and the chamber 21 at the rear end of the engine 16. The branch conduits of the second set are flared and united at their forward ends to provide a circular chamber 42 which annularly surrounds the intermediate portion of shaft 26. An axial flow fan or impeller 43 having an annular set of radially disposed blades 44 is mounted on shaft 26 within chamber 42 and draws air in through the open front end of this chamber, compresses the air and forces it into the discharge ducts where it is mixed with the engine exhaust gas and with the compressed air from the impeller or fan 38. An annular set of variable angle blades or vanes 45 is mounted in the open end of chamber 42 to guide the intake air into the impeller blades 44 to increase the efficiency of the impeller 43 and provide a control therefor.

Suitable mechanisms for controlling the angles of the variable angle blades 39 and 45 will be provided and these mechanisms will be actuated either manually or automatically to control the discharge blast in accordance with different operating conditions.

With the above described arrangement, the engine exhaust is not used directly to provide the propulsive jet but is first passed through the turbine rotor 24 where a large part of its energy is extracted and its speed and temperature greatly reduced. The energy extracted from the engine exhaust is used to operate at least two high speed fans or impellers which act independently or in parallel to withdraw air from the atmosphere, compress such air and discharge it along with the engine exhaust through the discharge conduits of the system. This provides a large volume discharge having a speed so much slower than the normal speed of engine exhaust that this discharge has an effective reactive thrust even at static thrust or near static thrust conditions.

While the present disclosure shows three discharge conduits and two fans or impellers acting in parallel, it is to be understood that the invention is in no way limited to these numbers as any convenient discharge duct system may be used and any number of air fans or impellers greater than one.

I claim:
1. An assembly for use in combination with an internal combustion engine producing a jet exhaust, said assembly comprising a chamber having a port, a plurality of primary ducts communicating with said chamber and extending in divergent directions therefrom rearwardly of said port and terminating in parallelly extending passages open to the atmosphere, turbine means located within said chamber and driven by the jet exhaust from said internal combustion engine, a shaft driven by said turbine means and extending externally from said chamber remote from said port and within the space bounded by said parallelly extending passages, a plurality of secondary ducts arranged in groups within the space bounded by said primary ducts and between said shaft and said primary ducts in spaced relation in the direction of said parallelly extending passages, one end of each of said secondary ducts of each group communicating with an adjacent primary duct and meeting in a common opening communicating with the atmosphere at the opposite end thereof in a direction facing said port each of said common openings providing a separate independent intake for parallel operation of the assembly, impeller means located within the common opening of each of said groups of secondary ducts and connected for rotation by said shaft whereby jet exhaust from the discharge end of an associated internal combustion engine enters said port and upon passing into said primary ducts rotates said turbine means, said shaft and said impeller means drawing air in at the end of said secondary ducts communicating with the atmosphere for discharge into said primary ducts mixing atmospheric air with the jet exhaust to provide large volume, slow speed discharge of engine exhaust and compressed air from said primary duct means for propulsive effort.

2. An assembly for use in combination with an internal combustion engine producing a jet exhaust as claimed in claim 1 wherein each of said common openings is provided with movable vanes to control the intake of each of said impeller means.

References Cited in the file of this patent
UNITED STATES PATENTS

| | | |
|---|---|---|
| 2,405,919 | Whittle | Aug. 13, 1946 |
| 2,470,348 | Haight | May 17, 1949 |
| 2,518,062 | Pouit | Aug. 8, 1950 |
| 2,523,938 | Berliner | Sept. 26, 1950 |
| 2,587,227 | Roy | Feb. 26, 1952 |
| 2,820,588 | Penn et al. | Jan. 21, 1958 |
| 2,936,973 | Kappus | May 17, 1960 |

FOREIGN PATENTS

| | | |
|---|---|---|
| 972,222 | France | Oct. 23, 1950 |
| 812,751 | Great Britain | Apr. 29, 1959 |